Figure 1:
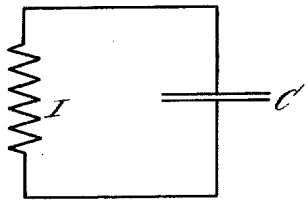

No. 12,149. REISSUED AUG. 25, 1903.

J. S. STONE.

APPARATUS FOR SELECTIVE ELECTRIC SIGNALING.

APPLICATION FILED JULY 22, 1903.

6 SHEETS—SHEET 1.

WITNESSES:
F. B. Spaulding
G. Adelaide Higgins

INVENTOR:
John Stone Stone

No. 12,149. REISSUED AUG. 25, 1903.

J. S. STONE.

APPARATUS FOR SELECTIVE ELECTRIC SIGNALING.

APPLICATION FILED JULY 22, 1903.

5 SHEETS—SHEET 2.

WITNESSES:
F. B. Spaulding
G. Adelaide Higgins

INVENTOR:
John S. Stone

No. 12,149. REISSUED AUG. 25, 1903.

J. S. STONE.

APPARATUS FOR SELECTIVE ELECTRIC SIGNALING.

APPLICATION FILED JULY 22, 1903.

5 SHEETS—SHEET 3.

WITNESSES:

F. B. Spaulding

G. Adelaide Higgins

INVENTOR:

John Stone Stone

No. 12,149. REISSUED AUG. 25, 1903.

J. S. STONE.

APPARATUS FOR SELECTIVE ELECTRIC SIGNALING.

APPLICATION FILED JULY 22, 1903.

5 SHEETS—SHEET 4.

WITNESSES:
F. B. Spaulding
G. Adelaide Higgins

INVENTOR:
John S. Stone

No. 12,149

J. S. STONE. Reissued Aug 25, 1903

APPARATUS FOR SELECTIVE ELECTRIC SIGNALING.

(Application filed Jan. 23, 1901.)

(No Model.)

5 Sheets—Sheet 5.

WITNESSES.
M. A. Lonbrick
R. A. Jones.

INVENTOR.
John Stone Stone
by Alex. P. Browne,
attorney.

No. 12,149. Reissued August 25, 1903.

UNITED STATES PATENT OFFICE.

JOHN STONE STONE, OF BOSTON, MASSACHUSETTS, ASSIGNOR, BY MESNE ASSIGNMENTS, TO THE STONE TELEGRAPH AND TELEPHONE COMPANY, OF PORTLAND, MAINE, A CORPORATON OF MAINE.

APPARATUS FOR SELECTIVE ELECTRIC SIGNALING.

SPECIFICATION forming part of Reissued Letters Patent No. 12,149, dated August 25, 1903

Original No. 714,831, dated December 2, 1902. Application for reissue filed July 22, 1903. Serial No. 166,556.

*To all whom it may concern:*

Be it known that I, JOHN STONE STONE, a citizen of the United States, residing at Boston, in the county of Suffolk and State of Massachusetts, have invented certain new and useful Improvements in Apparatus for Selective Electric Signaling, of which the following is a specification.

My invention relates to the art of transmitting intelligence from one station to another by means of electromagnetic waves without the use of wires to guide the waves to their destination; and it relates more particularly to the system of such transmission in which the electromagnetic waves are developed by producing electric vibrations in an elevated conductor, preferably vertically elevated.

Heretofore in signaling between two stations by means of electromagnetic waves when the stations are not connected by a conducting-wire certain disadvantageous limitations have been observed which greatly militated against the commercial value of the methods employed. When the electromagnetic waves are developed by producing natural or forced electric vibrations in a horizontal conductor, the attenuation of the waves so developed as they travel away from the conductor is found to be so great as to very seriously limit the distance to which they may be transmitted and effectively received, the chief cause of this observed phenomenon probably being that owing to the horizontal position of the conductor the plane of polarization of the waves is such as to cause the rapid absorption of the energy of the waves by the conducting-surface of the earth or water over which they travel. This difficulty has been overcome by a method of developing the waves which consists in producing natural electric vibrations in a vertically-elevated conductor, in which case the plane of polarization of the wave so produced is at quadrature with that of the waves which may be developed in a horizontal wire, and in case of the vertical conductor the attenuation of the waves is observed to be very much less than in the case of the horizontal conductor, so that these waves may be transmitted to and effectively received at much greater distances. A limitation of the commercial utility of this system is, however, observed, which depends upon the fact that it has not heretofore been found possible, so far as I am aware, to direct signals sent out from a transmitter-station to the particular receiving-station with which it is desired to communicate to the exclusion of other receiving-stations equipped with equally or more sensitive receiving apparatus and located within the radius of influence of the sending-station. Electromagnetic waves have also been developed by producing natural or forced electric oscillations in loops or coils of wire at the transmitting-station and also by means of the discharge of electricity between two conducting spheres, cylinders, or cones; but in such cases the sphere of influence is so limited as to greatly restrict the commercial utility of these two methods of developing the signal-waves. In fine, the method of signaling by means of electromagnetic waves between stations not connected by a conducting-wire, in which method the electromagnetic waves are developed by electric vibrations in an elevated conductor, has great advantages over the other existing or proposed methods for accomplishing this purpose in which the electromagnetic waves are developed by other means, since in the case of the waves developed by the elevated-conductor method the waves may be transmitted to and effectively received at greater distances than by the other systems; but, whereas in the systems employing the other methods of generating the waves the signals developed may, at least theoretically, be directed to the particular receiving-station with which it is desired to communicate, to the exclusion of other similar receiving-stations in the neighborhood, it has heretofore been found impossible, so far as I know, to accomplish this purpose in the system employing an elevated conductor or wire as the source of the electromagnetic waves.

The object of this invention is to overcome the herein-before described limitation to the system in which the waves emanate from vertical conductors, so that in such systems the transmitting-stations may selectively transmit their signals each to a particular receiving-station simultaneously or otherwise without mutual interference.

It is also the object of the invention to provide means whereby each of a plurality of transmitting and receiving stations in such a system may be enabled to selectively place itself in communication with any other station to the exclusion of all the remaining stations.

It is further the object of the present invention to enable the vertical or elevated conductor in such a system to be made the source of simple harmonic electromagnetic waves of any desired frequency independent of its length and other geometrical constants. Thus the frequency impressed upon the elevated conductor may or may not be the same as the natural period or fundamental of such conductor; but, as will be hereinafter explained, an elevated conductor that is aperiodic may be employed and is best adapted for use when the apparatus is to be used successively for different frequencies, and such aperiodic elevated conductor is likewise the preferred form of elevated conductor when two or more frequencies are to be simultaneously impressed upon or received by a single elevated conductor; but forced simple harmonic electric vibrations of different periodicities may each be separately impressed upon a different elevated conductor, and the several energies of the resulting electromagnetic waves may be selectively conveyed each to a separate translating device.

Before proceeding to describe the invention certain fundamental principles relative to electrical vibrations should be stated, as these principles are involved in the art of signaling by means of what may be called "unguided electromagnetic waves."

If the electrical equilibrium of a conductor be abruptly disturbed and the conductor thereafter be left to itself, electric currents will flow in the conductor, which tend to ultimately restore the condition of electrical equilibrium. These currents may be either unidirectional or oscillatory in character, depending upon the relation between the principal electromagnetic constants of the conductor—*i. e.*, upon its electromagnetic and electrostatic capacities and its resistance. These phenomena are analogous to the mechanical phenomena which are observed when the mechanical equilibrium of a system is abruptly disturbed and the system is thereafter left to itself. In the case of a mechanical system motions result which tend to restore the mechanical equilibrium of the system. These motions may consist either of a unidirectional displacement or of to-and-fro vibrations of the system or parts of the system, depending upon the relations which subsist between the principal mechanical constants of the system—*i. e.*, its moments of mass and elasticity and its friction coefficients. In general the determination of the relations which must subsist in order that an oscillatory restoration of equilibrium shall take place either in an electric or in a mechanical system and the determination of the period of these oscillations is very difficult; but in certain simple cases both the determination of the conditions for an oscillatory restoration of equilibrium and of the period of these oscillations is quite simple.

Figure 2:
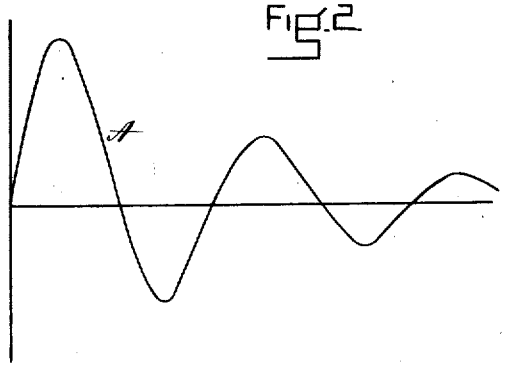
Figure 4:
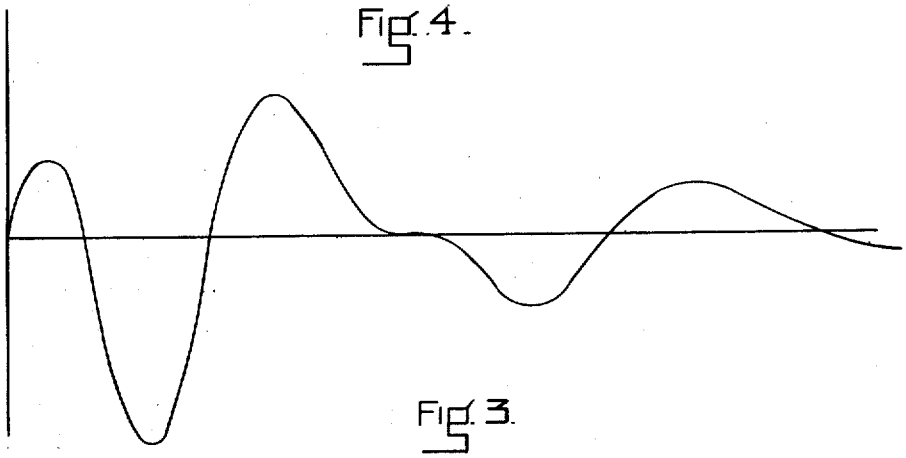
Figure 3:
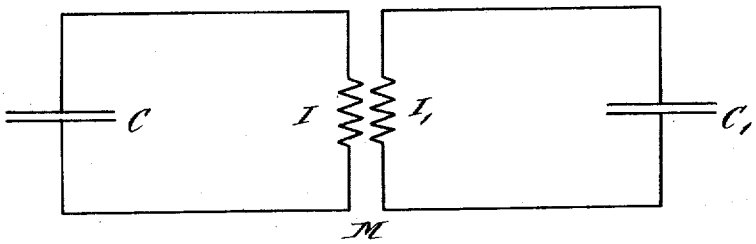

An example of a simple mechanical system capable of an oscillatory restoration of equilibrium is to be found in the torsional pendulum, which consists of a highly-elastic wire fixed at one end and supporting at its other extremity a heavy mass called the "bob." If a torsional stress be imparted to the wire of this pendulum by turning the bob about the axis of the wire and the bob be then abruptly released, the pendulum will in general execute isochronous oscillations about the axis of the suspending-wire in the process of restoration of equilibrium. An example of a simple electrical system capable of an oscillatory restoration of equilibrium is to be found in the case of a circuit consisting simply of a condenser and a coil without iron in its core, as shown in Figure 1 of the accompanying drawings, in which C is a condenser, and I is a coil without iron in its core. If a charge of electricity be imparted to the condenser and if its electrodes be then connected to the coil, as shown in Fig. 1, an isochronous oscillatory current will in general be developed in the circuit in the process of restoration of its electrical equilibrium. Such a simple circuit as that shown in Fig. 1 is known as a system with a "single degree of freedom," and the electric oscillations which it supports when its equilibrium is abruptly disturbed and it is then left to itself are known as the "natural" vibrations or oscillations of the system. These vibrations begin with a maximum of amplitude and gradually die away in accordance with what is known as an "expotential" law and are what are known as "simple harmonic vibrations." They may be represented graphically, as in Fig. 2, in which A is a curve drawn to rectangular coördinates, in which the ordinates represent instantaneous values of current strength and the abscissæ represent times. When two such simple circuits are associated together inductively, as shown in Fig. 3, the system so formed is known as a system of "two degrees of freedom," and in the oscillatory restorations of equilibrium—*i. e.*, in the natural vibrations in such circuits—the currents are in general not simple harmonic in character, but in general consist of the superposition of the simple harmonic currents, as shown in Fig. 4. In general if $n$ simple circuits, as shown in Fig. 1, be associated together in a system either by conductive or by inductive connections a system of at least $n$ degrees of freedom results, and the natural oscillations of such a system will therefore consist of the superposition of at least $n$ currents. It is, moreover, a fact that the different simple harmonic components of the oscillations which together constitute the oscillatory restoration of equilibrium of a complex system are in general not the same as those of the separate simple circuits when these circuits are isolated from one another; but the presence of each simple circuit modifies the natural period of each of the other circuits with which it is associated. Thus in a particular case if there be two simple circuits, the first with a natural period of .004 of a second when isolated and the second with a period of .0025 of a second when isolated, these circuits when inductively connected, as shown in Fig. 3, may have an oscillatory restoration of equilibrium, of which the simple harmonic components are .00444 of a second and .00159 of a second, showing that the inductive association of the circuits together has increased the natural period of the high-period circuit and decreased the natural period of the low-period circuit. It is, moreover, to be remembered that during the restoration of electric equilibrium currents of each of the periods are found in each of the circuits of the connected system.

So far we have considered the natural vibrations of electric systems—*i. e.*, the electric vibrations by means of which the electric equilibrium of circuits is restored after it has been abruptly destroyed and the circuits are left to themselves—and we have compared the simple case of such natural vibrations with the corresponding natural mechanical vibrations of mechanical systems. We have seen that simple circuits may have simple harmonic natural electric oscillations and that complex circuits will in general have complex electric oscillations. We have, moreover, seen that the natural period of oscillations depended upon the electromagnetic constants of the circuit in the case of a simple circuit and that each of the periods of oscillation in the case of a complex or of interrelated circuits depended upon the electromagnetic constants of each of the interrelated circuits; but besides the ability to execute natural vibrations or oscillations both electric and mechanical systems are capable of supporting what are termed "forced vibrations," and in the case of forced vibrations the period of the vibration is independent of the electromagnetic constants of the circuit on the one hand and the mechanical constants of the mechanical system on the other hand and depends only upon the period of the impressed force. Thus if a simple harmonic electromotive force be impressed upon a circuit free from hysteresis, whether it be a simple circuit or a complex of simple circuits, the forced vibrations or currents resulting from this impressed force will also be simple harmonic and of the same period as that of the impressed force.

In present systems of signaling by means of electromagnetic waves in which a vertical conductor is employed as the source of electromagnetic radiations the electric oscillations are of the kind hereinbefore described as "natural vibrations," the vertical conductor being charged to a high potential relative to the surrounding earth and permitted to abruptly discharge to earth by means of an electric spark between two ball-electrodes. In such a method of developing the electromagnetic waves the oscillations are necessarily of a complex character, and therefore the resulting electromagnetic waves are of a complex character and consist of a great variety of superimposed simple harmonic vibrations of different frequencies. The vibrations consist of a simple harmonic vibration of lower period than all the others, known as the "fundamental," with a great variety of simple harmonics of higher periodicity superimposed thereon. Similarly the vertical conductor at the receiving-station is capable of receiving and responding to vibrations of a great variety of frequencies, so that the electromagnetic waves which emanate from one vertical conductor used as a transmitter are capable of exciting vibrations in any other vertical wire as a receiver, and for this reason any transmitting-station in a system of this character will operate any receiving-station within its sphere of influence, and the messages from the transmitting-station will not be selectively received by the particular receiving-station with which it is desired to communicate, but will interfere with the operation of other receiving-stations within its sphere of influence, thereby preventing them from properly responding to the signals of the transmitting-stations from which they are intended to receive their signals.

By my invention the vertical conductor of the transmitting-station is made the source of electromagnetic waves of but a single periodicity, and the translating apparatus at the receiving-station is caused to be selectively responsive to waves of but a single periodicity, so that the transmitting apparatus corresponds to a tuning-fork, sending but a single simple musical tone, and the receiving apparatus corresponds to an acoustic resonator capable of absorbing the energy of that single simple musical tone only. When, however, the elevated conductor is aperiodic, it is adapted to receive or transmit all frequencies, and accordingly a single aperiodic elevated conductor may be associated with a plurality of local circuits each attuned to a different frequency after the manner now well known in the art of multiple telegraphy by wire conductors.

When a single elevated conductor is to be made a source of a plurality of single waves of different frequencies and when, moreover, these signal-waves are to be simultaneously developed, it is obviously necessary that the trains of waves of different frequencies developed in the elevated conductor shall be independent of each other—*i. e.*, it is necessary that the electric vibrations of one frequency impressed upon the elevated conductor shall not be affected by the act of simultaneously impressing vibrations of another frequency upon the conductor. The manner of developing the individual electric vibrations of a particular frequency described in this specification is such as to insure *per se* the required independence of the vibrations when several different frequencies are simultaneously impressed upon the elevated conductor. Several forms of such arrangements of the apparatus will nevertheless be hereinafter fully described in order to add to the completeness of the specification.

When the apparatus at a particular station is attuned to the same periodicity as that of the electromagnetic waves emanating from a particular transmitting-station, then this receiving-station will respond to and be capable of selectively receiving messages from that particular transmitting-station to the exclusion of messages simultaneously or otherwise sent from other transmitting-stations in the neighborhood which generate electromagnetic waves of different periodicities. Moreover, by my invention the operator at the transmitting or receiving station may at will adjust the apparatus at his command in such a way as to place himself in communication with any one of a number of stations in the neighborhood by bringing his apparatus into resonance with the periodicity employed by the station with which intercommunication is desired.

In order that the vertical conductor at the transmitting-station shall generate harmonic electromagnetic waves of but a single frequency, I cause the electric vibrations in the conductor to be of a simple harmonic character, and this in turn I accomplish by producing what are substantially forced electric vibrations in the vertical conductor in lieu of producing natural vibrations in the conductor, as has heretofore been practiced. In order that the electric translating apparatus at the receiving-station shall be operated only by electric waves of a single frequency and by no others, I interpose between the vertical conductor at the receiving-station and the translating devices a resonant circuit or circuits attuned to the particular frequency of the electromagnetic waves which it is desired to have operate the translating devices.

Having thus described, broadly, the nature and object of the invention and the electrical principles upon which it is based, the details of the invention may best be described by having reference to the drawings which accompany and form a part of this specification.

The same letters, so far as may be, represent similar parts in all the figures.

Figure 5:
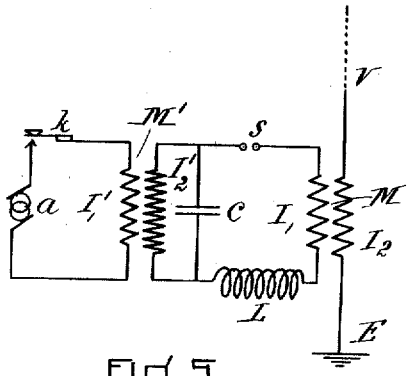
Figure 6:
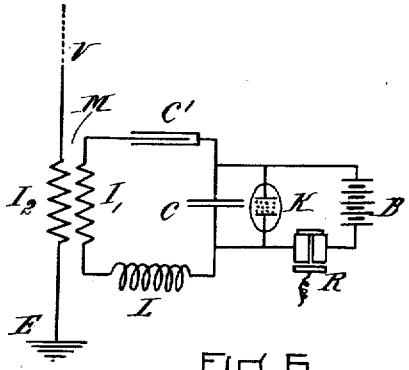
Figure 7:
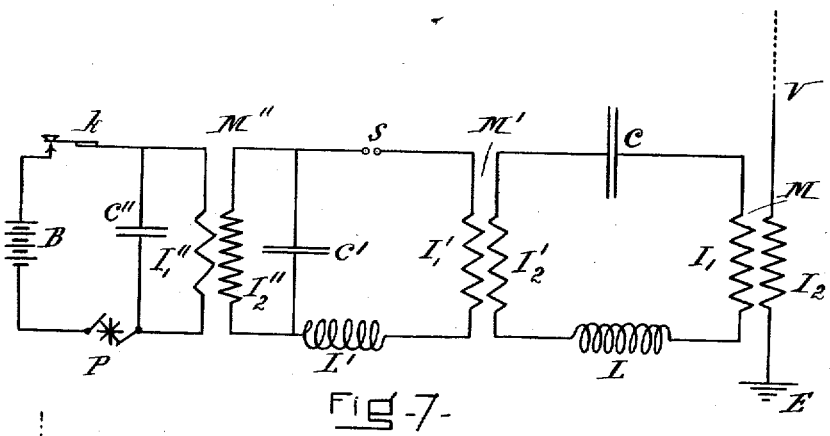
Figure 8:
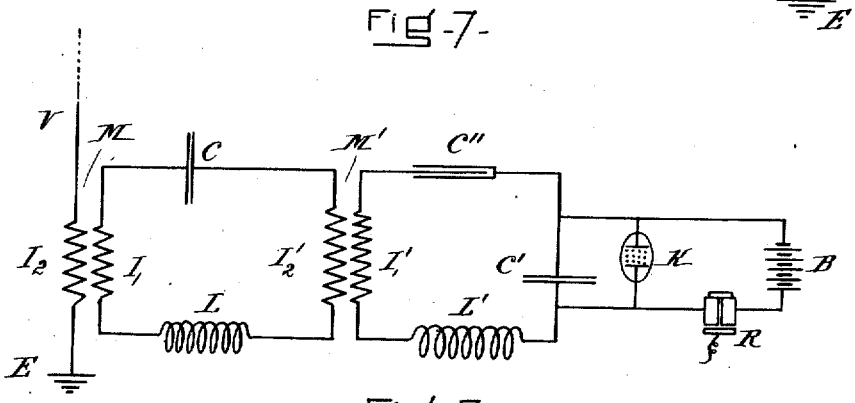
Figure 9:
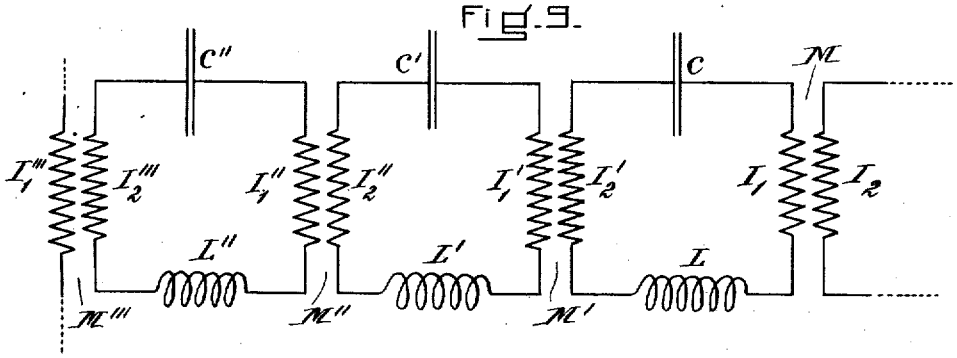
Figure 10:
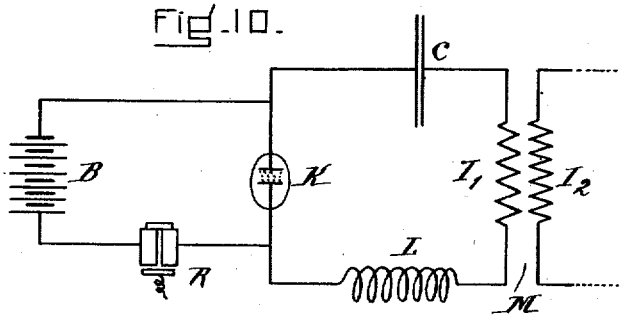
Figure 11:
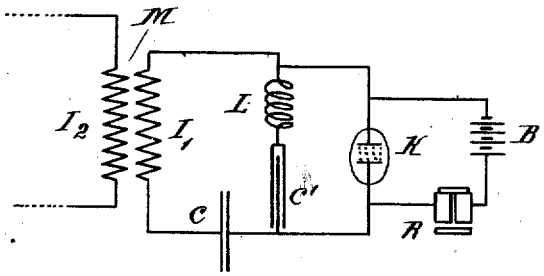
Figure 12:
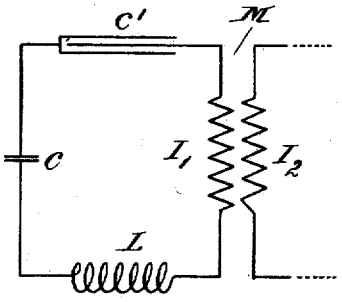
Figure 13:
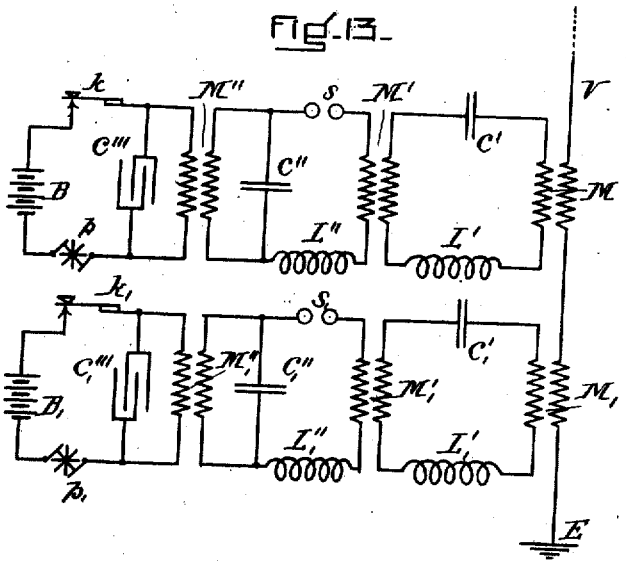
Figure 14:
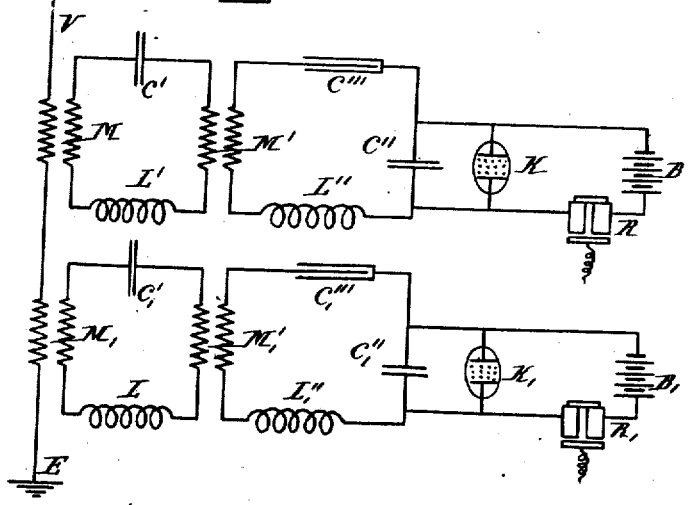
Figure 15:
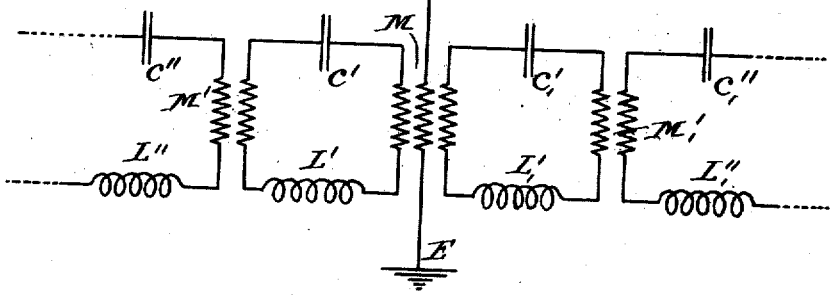
Figure 16:
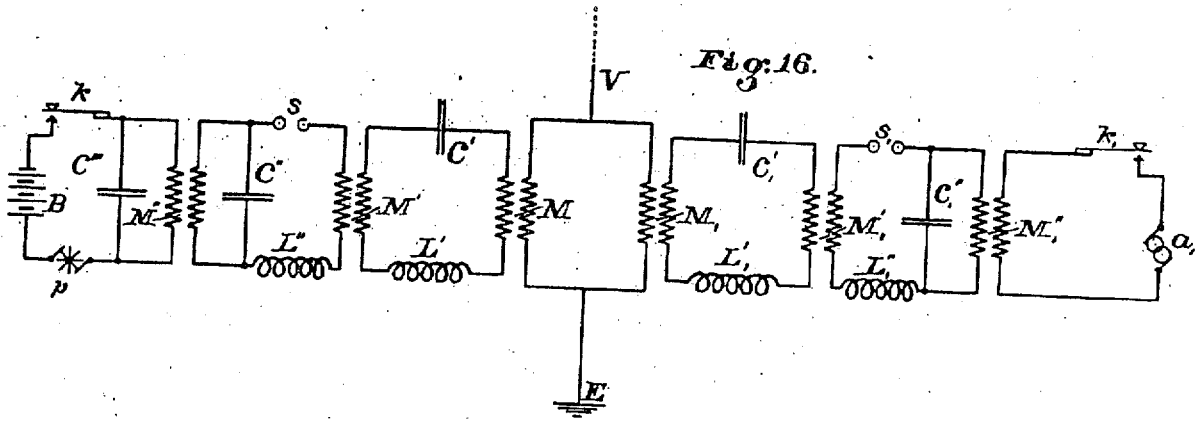
Figure 17:
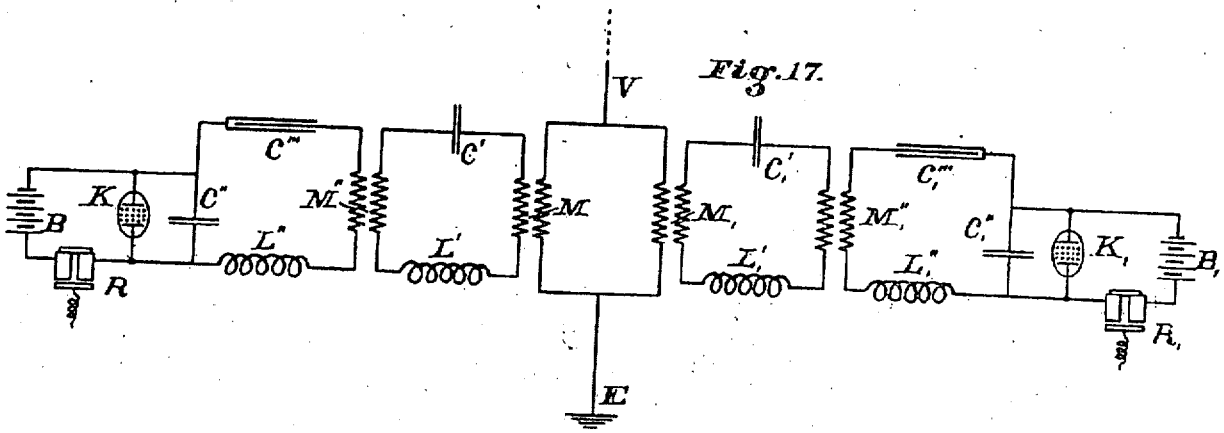

Figures 1 to 4 are diagrams already referred to. Fig. 5 is a diagram illustrating one arrangement of the transmitting-station. Fig. 6 is a diagram illustrating an arrangement of the receiving-station. Fig. 7 is a diagram illustrating another form of the transmitting-station. Fig. 8 is a diagram illustrating another form of the receiving-station. Figs. 9 and 15 are diagrams illustrating a detail of the construction at both transmitting and receiving stations. Figs. 10 and 11 are diagrams illustrative of the connection of the coherer at the receiving-stations. Fig. 12 is a diagram illustrating the connection of a condenser-telephone at the receiving-station. Figs. 13 and 16 are diagrams illustrative of forms of transmitter-stations capable of developing signal-waves of two different frequencies. Figs. 14 and 17 are diagrams illustrative of forms of receiving-stations capable of receiving selectively signal-waves of two different frequencies.

In the drawings, V represents a vertical or virtually vertical conductor grounded by the earth connection E.

M, M′, M″, and M‴ are induction-coils whose primary and secondary wires are $I_1$, $I'_1$, $I''_1$, and $I'''_1$ and $I_2$ $I'_2$ $I''_2$ $I'''_2$, respectively.

L, L′, and L″ are auxiliary inductance-coils.

C, C′, C″, and C‴ are electrical condensers.

K and $K_1$ are coherers.

B is an electric battery.

*a* is an alternating-current generator.

*k* and $k_1$ are circuit-closing keys.

R and $R_1$ are telegraphic relays or other suitable electric translating devices.

*p* and $p_1$ are automatic circuit-interrupters.

*s* and $s_1$ are spark-gaps.

In the organization illustrated in Fig. 5 the generator *a* develops an alternating electromotive force of moderate frequency, which when the key *k* is depressed develops a current in the primary circuit of the transformer M′. The transformer M′ is so designed as to transform the electromotive force in the primary circuit to a very high electromotive force in the secondary. As the potential difference at the terminals of the secondary $I'_2$ rises the charge in the condenser C increases till the potential difference is sufficient to break down the dielectric at the spark-gap *s*. When this occurs, the condenser C discharges through the spark at *s*, the primary $I_1$, and the inductance-coil L. This discharge is oscillatory in character and of very high frequency, as will be explained hereinafter. The high-frequency current so developed passing through the primary $I_1$ induces a corresponding high-frequency electromotive force and current in the secondary $I_2$, and forced electric vibrations result in the vertical conductor V, which are practically of a simple harmonic character. These simple harmonic vibrations in the conductor V develop electromagnetic waves, which are also practically simple harmonic in character, and these, in turn, on impinging upon the vertical conductor at the receiving-station develop therein corresponding simple harmonic vibrations of like frequency.

In the organization illustrated in Fig. 6 the simple harmonic electromagnetic waves of a given frequency or periodicity impinging upon the vertical conductor V develop therein corresponding electrical vibrations of like frequency. By means of the induction-coil M a vibratory electromotive force corresponding in frequency to the electric vibrations in the conductor V is induced in the secondary circuit $I_1$ L C C′. If the frequency of this induced electromotive force is that to which the circuit $I_1$ L C C′ is attuned, there will be a maximum potential difference developed at the plates of the condenser C, and this potential will operate the coherer K. When the coherer K operates, the resistance of the circuit B R K is enormously diminished and the battery B develops a current which operates the translating device R. The decoherer (not shown in the drawings) is thereby set in operation, and as soon as the impulse passes the coherer is restored to its sensitive condition. If, however, the frequency of the electromagnetic waves which impinge upon the vertical conductor V of the receiving-station depicted in Fig. 6 is not the same as that to which the circuit $I_1$ L C C′ is attuned, the electromotive force induced in this circuit will be different from that to which the circuit will respond by virtue of resonance, and there will be but a negligible potential difference developed at the plates of the condenser C. Under these circumstances the coherer K will not be operated and the signals will not actuate the translating device R.

When transmitting-stations and a corresponding number of receiving-stations are employed, by adjusting the electromagnetic constants of the circuits at the various stations these circuits may be so proportioned or tuned that the energy of the electromagnetic waves emanating from any given transmitting-station will be selectively received and absorbed at a given receiving-station.

Before proceeding to a description of the operation of the other two forms of transmitting and receiving stations (shown in Figs. 7 and 8) it is to be noted that the condenser C in Fig. 5 discharges through the circuit $s$ $I_1$L, and its discharge is practically unaffected by its conductive connection with the circuit through $I'_2$. The reason for this is that the impedance offered by the circuit through $I'_2$ is enormously greater than that through $s$ $I_1$L. Also the discharge through the circuit $s$ $I_1$ L is of very great frequency, because the frequency of the oscillations of such discharges of condensers is approximately inversely proportional to the square root of the product of the inductance of the circuit by the capacity of the condenser, and for the purpose of this invention the apparatus is so designed that the product of the capacity of the condenser by the inductance of the circuit is made numerically very small. Moreover, the oscillations in the circuit $s$ $I_1$ L are approximately simple harmonic in character and are practically unaffected by the inductive association with the vertical wire because of the auxiliary inductance furnished by the coil L, it being capable of demonstration that if by means of the coil L the inductance of the circuit L $I_1$ $s$ is rendered large compared to the mutual inductance between the circuit and the vertical wire the natural oscillations which will take place in the circuit $s$ $I_1$ L will be practically unaffected by the inductive association with the vertical wire and will therefore be practically of a simple harmonic character, as in the case of the isolated simple circuit shown in Fig. 1. The principle may for the present purpose be stated thus: that when two simple oscillators, each such as that shown in Fig. 1, are inductively associated with each other, as in Fig. 3, the system is a system of two degrees of freedom, and the natural period of oscillation of each simple circuit is modified by the presence of the other; but if the proportions of the circuits be such that the product of the inductance of the two circuits is large compared to the mutual inductance between the circuits the natural period of oscillation of each of the circuits becomes practically the same as if the circuits were isolated. If, further, the electric equilibrium of the circuit $s$ $I_1$ L be abruptly disturbed and the circuit be then left without impressed force, the oscillations which are developed in it induce corresponding oscillations in the vertical wire, which oscillations are virtually forced vibrations corresponding in frequency with the natural oscillations developed in the circuit $s$ $I_1$ L and being practically independent as regards their frequency of the constants of the second circuit in which they are induced.

The mathematical expression for the frequency to which a circuit is resonant when it is isolated from all other circuits—*i. e.*, has but a single degree of freedom—is well known and may be stated as follows:

$$n = \frac{1}{2\pi\sqrt{C_1 L_1}}$$

from which $$L_1 = \frac{1}{C_1 p^2},$$

where $n$ is the frequency, $C_1$ is the capacity, $L_1$ is the inductance, and $p$ is the periodicity which equals $2\pi n$. In the case of a circuit of two degrees of freedom, however, in order to make the component circuits each responsive to the same frequency as when isolated—in other words, to overcome the modifying effect of the mutual inductance of each circuit upon the other—it is necessary to consider in the case of inductive relation the expression:

$$\frac{1}{C_1 p^2} = L_1 - \frac{M^2_{12} p \left(L_2 p - \frac{1}{C_2 p}\right)}{R^2_2 + \left(L_2 p - \frac{1}{C_2 p}\right)^2}$$

where $C_1$ $L_1$ are the capacity and inductance of the first circuit $C_2$ $L_2$ $R_2$ are the capacity, inductance, and resistance, respectively, of the second circuit and $M_{12}$ is the mutual inductance of the circuits. From these expressions careful consideration will show that the effective inductance of the first circuit has been modified by its inductive relation with the second circuit, and it is:

$$L'_1 = L_1 - \frac{M^2_{12} p \left(L_1 p - \frac{1}{C_1 p}\right)}{R^2_1 + \left(L_1 p - \frac{1}{C_1 p}\right)^2}.$$

Similarly we have to consider the expression:

$$\frac{1}{C_2 p^2} = L_2 - \frac{M^2_{12} p \left(L_1 p - \frac{1}{C_1 p}\right)}{R^2_1 + \left(L_1 p - \frac{1}{C_1 p}\right)^2}$$

from which it will be seen that the effective inductance of the second circuit has been modified by its inductive relation with the first circuit and is $$L'_2 = L_2 - \frac{M^2_{12} p \left(L_1 p - \frac{1}{C_1 p}\right)}{R^2_1 + \left(L_1 p - \frac{1}{C_1 p}\right)^2}.$$

These two inductances $L'_1$ and $L'_2$ are the apparent inductances which each of these circuits would have if acting as a primary to induce simple harmonic vibrations of frequency $n$ in the other. It is therefore necessary in order to overcome the modifying effect of the mutual inductance on either circuit to add to that circuit an auxiliary inductance-coil of inductance large compared to the term of the form $$\frac{M^2 p \left(L p - \frac{1}{C p}\right)}{R^2 + \left(L p - \frac{1}{C p}\right)}$$

or at least so large that when it is added to the natural inductance of the circuit the sum of their inductances is very large compared to the said term.

It is to be understood that any suitable device may be employed to develop the simple harmonic force impressed upon the vertical wire. It is sufficient to develop in the vertical wire practically simple harmonic vibrations of a fixed and high frequency.

The vertical wire may with advantage be so constructed as to be highly resonant to a particular frequency, and the harmonic vibrations impressed thereon may with advantage be of that frequency. The construction of such a vertical wire is shown and described in other applications of mine now pending.

At the receiving-station shown in Fig. 6 the inductance-coil L is introduced in order to supply auxiliary inductance and to permit of the circuit C C' $I_1$ L being attuned to a particular frequency practically independently of the constants of the vertical wire.

In both the organizations illustrated in Figs. 5 and 6 the inductance-coils L may be made adjustable and serve as a means whereby the operators may adjust the apparatus to the particular frequency which it is intended to employ.

Passing now to the organizations illustrated in Figs. 7 and 8, it is to be noted that they differ, respectively, from those illustrated in Figs. 5 and 6 in that additional resonant circuits C $I'_2$ L $I_1$ are interposed between the vertical conductor and the generating and translating devices, respectively.

In the transmitter arrangements illustrated in Fig. 7 the circuit C $I'_2$ L $I_1$ is attuned to the same period as the circuit C' L' $I'_1$ *s* and merely tends to weed out and thereby screen the vertical wire from any harmonics which may exist in the current developed in the circuit C' L' $I'_1$ *s*. This screening action of an interposed resonance-circuit is due to the well-known property of such circuits by which a resonant circuit favors the development in it of simple harmonic currents of the period to which it is attuned and strongly opposes the development in it of simple harmonic currents of other periodicities. In this organization an ordinary spark-coil, (shown at M'',) equipped in the usual way with an interrupter *p* and condenser C'', is employed, the current being supplied by the battery B. The operation of this organization is substantially the same as that of the organization shown in Fig. 5, hereinbefore described, except for the screening action of the circuit C $I'_2$ L $I_1$ and need not, therefore, be further described. Suffice it to say that when the source of vibratory currents is particularly rich in harmonics any suitable number of resonant circuits each attuned to the desired frequency may be connected inductively in series, as shown in Figs. 9 and 15, and interposed between the generating device and the vertical conductor for the purpose of screening the vertical conductor from the undesirable harmonics.

In the organization illustrated in Fig. 8 the electric resonator C $I'_2$ L $I_1$, interposed between the vertical conductor and the circuit containing the coherer, is attuned to the same period as the circuit L' C' C'' $I'_1$ and acts to screen the coherer-circuit from the effect of all currents developed in the vertical conductor save that of the current of the particular period to which the receiving-station is intended to respond. As in the case of the transmitting-station, any suitable number of resonant circuits, each attuned to the particular period to which the station is desired to respond, may be connected, as shown in Figs. 9 and 15, and interposed between the vertical conductor and the coherer circuit. Such circuits so interposed serve to screen the receiver from the effects of all currents which may be induced in the vertical conductor that are not of the period to which the receiving-station is intended to respond.

No mention has heretofore been made of the function of the condensers shown at C′ in Fig. 6 and at C″ in Fig. 8, as those condensers are not essential to the tuning of the circuits in which they are placed, but merely serve to exclude the current of the batteries B from the resonant circuits. In order that these condensers may not appreciably affect the tuning of the circuits in which they are included, and thereby lower the resonant rise of potential at the plates of the condensers C and C′, (shown in Figs. 6 and 8,) they are so constructed as to have large capacities compared to the capacities of C and C′ in Figs. 6 and 8, respectively.

In Figs. 6 and 8 the coherers K are shown connected in shunt-circuit to the condensers C and C′, respectively; but they may be connected serially in the resonant circuit, as shown in Fig. 10, or they may be connected in shunt-circuit to the coil L and condenser C′, as shown in Fig. 11.

Though a coherer has been shown and described in the specification as the means of detecting the presence of oscillations in the receiving resonant circuits, under which circumstances it operates as a telegraphic relay to control a local-battery circuit including an electric translating device, any other suitable electroreceptive device may be employed to receive the signal—as, for example, a condenser-telephone. When a condenser-telephone is employed as a receiver, the receiving resonant circuit may be that illustrated in Fig. 12, in which C is the condenser-telephone and also the capacity by which the circuit L C C′ $I_1$ is attuned.

The apparatus shown in Figs. 13, 14, 15, 16, and 17 illustrates methods of associating the apparatus hereinbefore described, and illustrated in Figs. 5, 6, 7, 8, and 9, when two or more stations are to be associated with a common elevated conductor. The operation of each individual station is the same as that already described in connection with Figs. 5, 6, 7, 8, and 9. For the sake of clearness only two stations are shown associated with the common elevated conductor V in the drawings; but it is obvious that any desired number of stations may be associated with a common elevated conductor in the same manner.

An inspection of the drawings will show that Figs. 13 and 16 illustrate two transmitting-stations of the type shown in Fig. 7 associated with a common elevated conductor, whereas Figs. 14 and 17 illustrate two receiving-stations of the type shown in Fig. 8 associated with a common elevated conductor.

When a plurality of stations are associated with a common elevated conductor, each of the stations is characterized by being tuned to a different frequency from that of any of the other stations so associated. In Figs. 13, 14, 15, 16, and 17 it will be observed that the two different stations associated with a common elevated conductor have therein been differentiated by attaching a subscript to the letters of reference in the case of one of the stations and not to the letters of reference of the other station.

The operation of each of the transmitting-stations in Figs. 13 and 16 is identical with that of the transmitting-station illustrated in Fig. 7, and the operation of each of the ceiving-stations shown in Figs. 14 and 17 is identical with the operation of the receiving-station illustrated in Fig. 8.

To illustrate, the step-up transformer or spark-coil M″ in Figs. 13 and 16 is equipped with an interrupter $p$ and condenser C‴, and the current is supplied by the battery B. When the key $k$ is depressed, a high potential is developed in the secondary of M″. As the potential difference at the terminals of the secondary of M″ rises the condenser C″ is charged till the resulting potential difference at $s$ is sufficient to break down the spark-gap $s$. When this occurs, the condenser C″ discharges through the spark at $s$, the primary of M′, and the inductance-coil L″. This circuit is attuned to a given high frequency, and the oscillatory current which results is therefore of that frequency. This current induces a similar current in the interposed resonant circuit L′ M′ C′ M attuned to the same frequency, which current in turn induces a current of corresponding frequency in the conductor V M E.

Passing now to the operation of the receiving-stations shown in Figs. 14 and 17, it may be remarked that since the operation of each of these stations is identical with the operation of the receiving-station shown in Fig. 8 the energy of the waves of one particular frequency will be absorbed by one of the receiving-stations and the energy of the waves of another particular frequency will be absorbed by the other receiving-station. This selective reception of the energy of waves of a particular frequency is independent of the number of waves of different frequencies which may be simultaneously present.

It is to be here noted that the above-described methods of simultaneously transmitting and receiving space-telegraph messages by a common elevated conductor are not described as the preferred methods, but that any way of associating a plurality of the stations shown in Figs. 5, 6, 7, and 8 with a vertical conductor will result in a system for simultaneously transmitting and receiving space-telegraph signals, owing to the fact that these stations are in themselves inherently selective and are capable of causing the independent development of vibrations of different frequencies in the elevated conductor and of selectively absorbing the energy of different frequencies, since the branch circuits M $M_1$ in Figs. 16 and 17 are not in themselves selective and since the elevated conductors in Figs. 13 and 14 contain a number of induction-coils in series not essential to the operation of any one of the stations singly.

The branch circuits M $M_1$ of Fig. 17 are not selective, since they contain but one element of a tuned circuit—viz., the inductance of M and $M_1$. Vibratory currents, of whatever frequency they may be, communicated by the vertical wire to these circuits will divide among them in single inverse proportion to their electromagnetic impedances and are not selective except for a slight reaction due to the associated circuits C′ M′ L′ and $C'_1$ $M_1$ $L'_1$. These reactions, so far from tending to make the branches selective to the frequencies to which their associated circuits are intended to respond, will, in fact, cause them to oppose more strongly currents of these frequencies than those to which the associated circuits are not attuned. Again, it is obvious that the inductance of the coil M in Fig. 13 is merely an additional impedance in the elevated conductor, which, to say the least, cannot assist in the development of vibrations in the elevated conductor impressed by circuit $C'_1$ $M'_1$ $L'_1$ $M_1$. The same is obviously true of the coil $M_1$ in the elevated conductor with reference to the operation of the circuit C′ M′ L′. Now passing to the transmitting-station shown at Fig. 16, it is obvious that the vibrations communicated by the circuit C′ M′ L′ to the elevated conductor V are subject to a shunt due to the coil $M_1$ in the other branch of the elevated conductor, and, conversely, the vibrations developed in the elevated conductor by the associated circuit $C'_1$ $M'_1$ $L'_1$ are subject to a shunt due to the coil M in the other branch of the elevated conductor. Finally, the coil M in the elevated conductor in Fig. 14 can at best only present an impedance to the waves intended to be received by the circuit $C'_1$ $M'_1$ $L'_1$, and, conversely, the coil $M_1$ in the elevated conductor can at best only present an impedance to the vibrations intended to be received by the circuit C′ M′ L′.

In constructing the various parts of the apparatus shown and described in this specification there is great latitude as to the special forms that may be given them; but it must be remembered that when a circuit is to be tuned and it is desired to gain a high degree of resonance both electrostatic and magnetic hysteresis must be carefully excluded from the resonant circuit. For this reason all iron should be excluded from the coils in the resonant circuits, and solid dielectrics should not ordinarily be employed in the condensers. These injunctions apply to the construction of resonant circuits attuned to very high frequencies, but not with the same force to the construction of resonant circuits to be tuned to low frequencies. Another precaution to be taken in the construction of the apparatus included in the resonant circuits when very high-frequency currents are employed is that conductors between which there exists a considerable potential difference during the operation of the apparatus shall be kept as far apart as practical, because of the excessive displacement-currents which tend to flow in the case of high-frequency currents. For this reason it will often be found to be convenient to build the coils in the form of flat spirals instead of long spirals of several layers, as is the usual construction of coils. Flat spirals with the turns well separated in order to minimize the displacement-currents between the turns are, however, by no means the only forms of coils adapted to be used in conjunction with air-condensers for the purpose of tuning circuits to high frequencies and may often be neither the best nor most convenient form of coil to employ. Therefore in defining the character of the coils to be employed for this purpose it will be of advantage to first give the general theoretical considerations which lead to a special construction of the coils and to then give a practical guide to the manner of designing the coils for a particular frequency or range of frequencies.

A coil or solenoid as usually constructed consists of many turns of cotton or silk insulated wire wound on an insulating-core, such as a glass or ebonite tube or a wooden spool, the consecutive turns being separated only by the thin insulating coating of the wire. These solenoids, moreover, are in general wound with several layers of wire, the layers also being separated from each other only by the insulating coatings of the wires. Such solenoids are well adapted to be used in conjunction with condensers having solid dielectrics for the purpose of tuning circuits to low frequencies; but neither such coils nor such condensers are available for the purpose of tuning circuits to such high frequencies as are concerned in the present invention. In the case of high frequencies the energy absorbed in the solid dielectric of the condenser due to dielectric hysteresis is excessive and the displacement-currents between the adjacent turns and layers of the coil mask and neutralize the inductance of the coil. Moreover, the solid dielectric forming the core of such coils exerts a deleterious effect, which in some instances is probably partially due to its possessing a small degree of conductivity, but which must in most instances be ascribed to the high specific inductive capacity of the material and to its dielectric hysteresis.

In order to tune a circuit to a predetermined high frequency, so that it shall show a well-defined selectivity for that frequency to the exclusion of other frequencies, even to the exclusion of frequencies differing but slightly from the predetermined frequency, it is necessary not only that the condenser shall be free from dielectric hysteresis, but that the coil shall be so constructed as to behave for that frequency practically like a conductor having a fixed resistance and a fixed inductance, but devoid of capacity. Coils constructed in the usual way do not behave for high frequencies as if they had a fixed resistance and inductance and no capacity, but partake more of the character of conductors having distributed resistance, inductance, and capacity. In fact, they may in some instances behave with high frequencies more like condensers than like conductors having fixed resistance and inductance and no capacity. Since a coil constructed in the usual way behaves for high frequencies as a conductor having distributed resistance, inductance, and capacity, it follows that such a coil will show for high frequencies the same quasi-resonance as is observed with low frequencies in long aerial lines and cables—*i. e.*, that it will *per se* and without the intermediary of a condenser show a slight degree of selectivity for some particular frequency and for certain multiples of that frequency just as a stretched string which has distributed inertia and elasticity will respond to a particular tone called its "fundamental" and to all other tones whose periods are aliquot parts of the periods of that fundamental; but it is not with such quasi-resonance that the present invention is carried into effect, and I wish it understood that I here disclaim any system employing distributed inductance and capacity as a means of tuning the resonant circuits described in this specification.

A general criterion which determines the utility of a coil for tuning a circuit to a particular high frequency is that the potential energy of the displacement-currents in the coil shall be small compared to the kinetic energy of the conduction-current flowing through the coil when the coil is traversed by a current of that frequency.

I have found that for a single-layer coil the following procedure is sufficient for practical purposes. Determine the inductance of the coil by formulæ to be found in the text-books and treatises on electricity and magnetism. This will enable the kinetic energy of the coil to be determined for any particular current and will also permit of the determination of what would be the potential gradient along the coil for the current of the frequency to be employed if the coil were devoid of distributed electrostatic capacity. Next calculate the electrostatic capacity between an end turn and each of the remaining turns of the coil. These capacities, together with the potential gradient found, will enable the potential energy to be determined, and if the ratio of the potential energy to the kinetic energy so found be negligible compared to unity the coil will practically satisfy the requirements hereinbefore mentioned. If the coil does not meet the requirements, the design should be so changed as to increase the separation between the turns or the size of the wire should be diminished or the dimensions of the coil so otherwise altered as to decrease the distributed capacity without proportionately diminishing the inductance. The calculations may be greatly abbreviated and the liability to error greatly reduced if the results of the computations be plotted in curves.

Regarding the effect of a dielectric core in a coil to be used for tuning a circuit to a high frequency, it is sufficient to state that the preferred form of support for such a coil is any skeleton frame which will hold the turns of wire in place without exposing much surface of contact to the wires and affording a minimum of opportunity for the development of displacement-currents within itself.

In this specification I have spoken of elevated conductors, vertically-elevated conductors, and vertical conductors. I wish to be understood as including in the term "elevated" conductors disposed at an angle to the earth's surface as distinguished from horizontal conductors disposed parallel to the earth's surface. By the terms "vertically elevated" and "vertical" I refer to conductors whose disposition with regard to the earth's surface is mainly or wholly at a right angle or vertical thereto, which is the particular form of elevated conductor preferred by me for use in connection with my present improvement.

In this specification I have described the development of free or unguided electromagnetic signal-waves of a given frequency by employing in association with an elevated conductor a circuit such as to produce therein forced simple harmonic electric vibrations of the frequency desired. I have also described a method of receiving or absorbing the energy of free or unguided simple harmonic electromagnetic waves of one frequency to the exclusion of waves of a different frequency by associating with an elevated conductor a circuit made resonant to the frequency of the waves whose energy is to be absorbed. The circuit whereby forced simple harmonic electric vibrations are produced in the elevated conductor I have shown as a circuit containing a condenser and a self-induction coil so proportioned as to make the natural vibrations of a frequency which is the frequency of the vibrations to be forced or impressed in an elevated conductor. The circuit whereby the energy of the electromagnetic waves of one frequency is absorbed to the exclusion of that of waves of another frequency is in like manner a circuit containing a condenser and a self-induction coil so proportioned as to make the circuit resonant to a frequency which is the frequency of the waves the energy of which is to be received. Both of the circuits I have spoken of are tuned circuits, and they may be conveniently distinguished with reference to their respective functions by denominating the circuit employed in the development of the vibrations as an "oscillating" or "sonorous" circuit and by denominating the circuit employed in the reception or absorption of the vibrations as a "resonant" circuit. I prefer to make this discrimination in nomenclature for the reason that while both the circuits are resonant circuits, yet functionally only that one employed for receiving or absorbing is accurately so described. Except for this distinction in function it is well to note that all oscillating or sonorous circuits are resonant circuits, but only such resonant circuits as have their resistance less than the square root of the ratio of four times their inductance by their capacity are oscillating or sonorous circuits.

Also throughout this specification I have described the electrical oscillations or vibrations and the free or unguided electromagnetic waves or radiations as simple harmonic. It is the object of my present invention to approach as nearly as possible to the perfect simple harmonic wave, and such object is attained to within such a degree of precision as to preclude any possible interference with the operation of the system by any departure that can exist in the wave from the absolute simple harmonic form. My reason for confining the description of the electrical oscillations or vibrations and the electromagnetic waves or radiations to the simple harmonic type is that in the operation of the system only simple harmonic waves and vibrations are effective in carrying out the object of the invention. If in any similar system of selective space-telegraphy there be frequent, even minute, overtones accompanying the simple harmonic signal-waves, such overtones will not only not contribute to the useful operation of the system, but may, in fact, become obstacles to such useful and complete operation. It is for this reason that I have taken every precaution to obtain a true or absolute simple harmonic wave form.

Specifically, though it may be possible to employ for the purpose of multiple and selective wireless telegraphy electric vibrations and radiations departing considerably from the simple harmonic type by employing at the receiving end circuits selective to the fundamental of such vibrations and radiations, yet it will only be through the selective reception of that simple harmonic component of the vibrations or radiations which is their fundamental that the system will be operative. The other simple harmonic components of the vibrations or radiations add nothing to the operation of the system. Moreover, if such overtones exist in the waves emanating from a transmitting-station their presence will preclude the possibility of placing receiving-stations in the immediate neighborhood of such transmitting-station for the reception of signal-waves of frequencies corresponding to the frequencies of such overtones.

Whereas in the present specification I have used the term "elevated" conductor to describe the source of radiation of electromagnetic waves developed by forced electric vibrations impressed thereon, yet I deem it proper to point out that this expression should not be confused with the term "conductor" when used in connection with systems wherein that term is employed to denote a wire or other metallically-continuous conductor extending from a transmitting to a receiving station. It is of course obvious that in the art to which the present specification relates such a conductor is wholly absent. The vertical metallically-continuous source of radiant energy is a structure the location and function of which are confined entirely to the transmitting, or it may be the receiving, end of a system in which the conductor which connects the transmitting and receiving stations is the non-metallic non-conducting—in fact, dielectric—medium, which is commonly called the "ether" and which is by many assumed to be essential to the theory of the propagation of electrical and magnetic force, radiant light, and radiant heat.

Having described my invention, I claim—

1. In a system for developing free or unguided simple harmonic electromagnetic signal-waves of a definite frequency, an elevated conductor and means for developing therein forced simple harmonic electric vibrations of corresponding frequency.

2. In a system for receiving the energy of free or unguided simple harmonic electromagnetic signal-waves of a definite frequency, to the exclusion of the energy of signal-waves of other frequencies, an elevated conductor and a resonant circuit associated with said conductor and attuned to the frequency of the waves, the energy of which is to be received.

3. In a system for independently developing free or unguided simple harmonic electromagnetic signal-waves of different frequencies, an elevated conductor and means for independently developing therein forced, simple harmonic, electric vibrations of different and corresponding frequencies.

4. In a system for selectively receiving the energy of free or unguided, simple harmonic, electromagnetic signal-waves of different frequencies, each to the exclusion of the rest, an elevated conductor, and resonant circuits associated with said conductor and each attuned to the frequency of a different one of the trains of waves, the energy of which is to be received.

5. In a system for independently developing free or unguided simple harmonic, electromagnetic signal-waves of different frequencies, a plurality of elevated conductors corresponding to the number of said different frequencies, and means for impressing upon each of said conductors forced simple harmonic electric vibrations corresponding to a different one of the said frequencies.

6. In a system for selectively receiving the energy of free or unguided simple harmonic, electromagnetic signal-waves of different frequencies, a plurality of elevated conductors corresponding in number to the number of different frequencies to be received, and resonant circuits each associated with a different elevated conductor, and each attuned to a different one of the said frequencies.

7. In a system for producing free and unguided electromagnetic signal-waves of a definite frequency, an elevated conductor, a source of electrical energy and a group of resonant circuits interposed between said elevated conductor and said source of electrical energy, said circuits being attuned to the frequency of the waves to be developed.

8. In a system for receiving the energy of free or unguided simple harmonic, electromagnetic signal-waves of one frequency to the exclusion of the energy of those of other frequencies, an elevated conductor, an electric translating device, and a group of resonant circuits interposed between said elevated conductor and said electric translating device, said circuits being resonant to the frequency of the waves, the energy of which is to be received.

9. In a system for developing free or unguided simple harmonic, electromagnetic signal-waves, a condenser, means for charging and discharging said condenser through a closed circuit having inductance adapted to produce under such conditions simple harmonic electric vibrations, and means for communicating the vibrations so produced to an open circuit or elevated conductor.

10. In a system for developing free or unguided, simple harmonic, electromagnetic signal-waves, a condenser, means for charging and discharging said condenser through a closed circuit having inductance adapted to produce under such conditions simple harmonic electric vibrations, means for communicating said vibrations to a resonant circuit or group thereof attuned to the frequency of these vibrations and means of communicating the resulting electrical vibrations in said resonant circuit or group thereof to an open circuit or elevated conductor.

11. A circuit resonant to a given high frequency comprising a coil having the amplitude of its potential energy small compared to the amplitude of its kinetic energy when it is supporting a current of said given high frequency, and a condenser adapted to balance by its reactance, the reactance of said coil for said given high frequency.

12. In a circuit resonant to a given high frequency, a coil having the amplitude of its potential energy small compared to the amplitude of its kinetic energy when supporting a current of said given high frequency.

13. In a system for selectively receiving the energy of free or unguided simple harmonic electromagnetic signal-waves of different frequencies, an elevated conductor, and a plurality of resonant circuits associated with said elevated conductor, each resonant to the particular frequency of the electromagnetic waves, the energy of which it is to receive.

14. In a system for selectively receiving the energy of free or unguided simple harmonic, electromagnetic, signal-waves of different frequencies, a plurality of elevated conductors, each associated with a circuit resonant to the particular frequency of the electromagnetic waves, the energy of which it is to receive.

15. In a system for selectively receiving the energy of free or unguided simple harmonic, electromagnetic, signal-waves of different frequencies, a plurality of elevated conductors, each associated with a group of circuits resonant to the particular frequency of the electromagnetic waves the energy of which it is to receive.

16. In a system for selectively receiving the energy of free or unguided simple harmonic, electromagnetic signal-waves of different frequencies, an elevated conductor and a plurality of groups of resonant circuits associated with said elevated conductor, each of said groups of circuits being resonant to the particular frequencies of the electromagnetic waves, the energy of which it is to receive.

17. In a system for receiving the energy of free or unguided, simple harmonic, electromagnetic signal-waves of a definite frequency to the exclusion of energy of signal-waves of other frequencies, an elevated conductor and a group of resonant circuits associated with said conductor and attuned to the frequency of the waves, the energy of which is to be received.

18. In a system for selectively receiving the energy of free or unguided, simple harmonic, electromagnetic signal-waves of different frequencies, each to the exclusion of the rest, an elevated conductor and a plurality of resonant circuits associated with said conductor and each attuned to the frequency of a different one of the trains of waves, the energy of which is to be received.

19. In a system for selectively receiving the energy of free or unguided simple harmonic, electromagnetic signal-waves of different frequencies, a plurality of elevated conductors corresponding in number to the number of different frequencies to be received, and groups of resonant circuits each associated with a different elevated conductor, and each attuned to a different one of the said frequencies.

20. In a system for developing free or unguided simple harmonic, electromagnetic signal-waves or radiations, an elevated conductor, associated closed oscillating circuits, means for disturbing the electrical equilibrium of said oscillating circuits, and means for swamping the effect of the mutual inductance between said circuit and the elevated conductor.

21. In a system for independently developing free or unguided electromagnetic signal-waves or radiations of different frequencies, an elevated conductor, associated closed oscillating circuits each attuned to a different one of the frequencies to be developed, and each of said oscillating circuits having sufficient auxiliary inductance to swamp the effect of the mutual inductance between it and the other oscillating circuits and between it and the elevated conductor.

22. In a system for receiving the energy of simple harmonic, electromagnetic waves of a given frequency, to the exclusion of like waves of different frequencies, an elevated conductor, a circuit associated with said elevated conductor and made resonant to the frequency of the electromagnetic waves, the energy of which is to be received, by the condenser and an auxiliary inductance-coil whose inductance is sufficient to swamp the effect of the mutual inductance between the associated circuit and the elevated conductor.

23. In a system for receiving the energy of simple harmonic, electromagnetic waves of one frequency, to the exclusion of like waves of different frequencies, an elevated conductor, associated circuits each resonant to the frequency of the electromagnetic waves to be received, and each having sufficient auxiliary inductance to swamp the effect of the mutual inductance between it and the other associated circuits and between it and the elevated conductor.

24. In a system for developing simple harmonic, electromagnetic signal-waves or radiations of a given frequency, a metallically-continuous vertical oscillator and means for impressing thereon simple harmonic, electrical, oscillations of the same frequency.

25. In a system for simultaneously developing simple harmonic, electromagnetic, signal-waves of different frequencies, a metallically-continuous vertical oscillator, and means for impressing thereon simple harmonic electrical oscillations of the same frequencies.

26. In a system for receiving the energy of free or unguided, simple harmonic, electromagnetic waves, an elevated conductor, a circuit associated with said elevated conductor and resonant to the frequency of the electromagnetic waves, and an electric translating device shunted around the terminals of one of the elements of said resonant circuit.

27. In a system for receiving the energy of free or unguided, simple harmonic, electromagnetic waves, an elevated conductor, a group of resonant circuits associated with said elevated conductor, resonant to the frequency of the electromagnetic waves, and an electric translating device shunted around the terminals of one of the elements of that one of said resonant circuits which is farthest removed from the elevated conductor.

28. In a system for receiving the energy of free or unguided, simple harmonic, electromagnetic waves, an elevated conductor and an electric translating device forming one of the elements of a resonant circuit associated with said elevated conductor and resonant to the frequency of the electromagnetic waves.

29. In a system for receiving the energy of simple harmonic, electromagnetic waves of a given frequency, to the exclusion of like waves of different frequencies, an elevated conductor, a circuit associated with said elevated conductor and made resonant to the frequency of the electromagnetic waves, the energy of which is to be received, and means for swamping the effect of the mutual inductance between said circuit and the elevated conductor.

30. In a system for receiving the energy of simple harmonic, electromagnetic waves of one frequency, to the exclusion of like waves of different frequencies, an elevated conductor, associated circuits each resonant to the frequency of the electromagnetic waves to be received, and means in each of said circuits for swamping the effect of the mutual inductance between it and the other circuits and between it and the elevated conductor.

31. In a system for receiving the energy of free or unguided, simple harmonic, electromagnetic signal-waves of a definite frequency, to the exclusion of the energy of signal-waves of other frequencies, an elevated conductor, a resonant circuit associated with said conductor and attuned to the frequency of the waves, the energy of which is to be received, and means for swamping the effect of the mutual inductance between said circuit and the elevated conductor.

32. In a system for selectively receiving the energy of free or unguided, simple harmonic, electromagnetic signal-waves of different frequencies, each to the exclusion of the rest, an elevated conductor, resonant circuits associated with said conductor and each attuned to the frequency of a different one of the trains of waves, the energy of which is to be received, and means for swamping the effect of the mutual inductance between said circuit and the elevated conductor.

33. In a system for selectively receiving the energy of free or unguided, simple harmonic, electromagnetic, signal-waves of different frequencies, a plurality of elevated conductors corresponding in number to the number of different frequencies to be received, resonant circuits each associated with a different elevated conductor and each attuned to a different one of the said frequencies, and means in each of said circuits for swamping the effect of the mutual inductance between it and the other circuits and between it and the elevated conductor.

34. In a system for producing free and unguided, electromagnetic signal-waves of a definite frequency, an elevated conductor, a source of electrical energy, a group of resonant circuits interposed between said elevated conductor and said source of electrical energy, said circuits being attuned to the frequency of the waves to be developed, and means in each of said circuits for swamping the effect of the mutual inductance between it and the other circuits and between it and the elevated conductor.

35. In a system for receiving the energy of free or unguided, simple harmonic, electromagnetic signal-waves of one frequency, to the exclusion of the energy of those of other frequencies, an elevated conductor, an electric translating device, a group of resonant circuits interposed between said elevated conductor and said electric translating device, said circuits being resonant to the frequency of the waves, the energy of which is to be received, and means in each of said circuits for swamping the effect of the mutual inductance between it and the other circuits and between it and the elevated conductor.

36. In a system for developing free or unguided, simple harmonic, electromagnetic signal-waves, a condenser, means for charging and discharging said condenser through a closed circuit having inductance adapted to produce under such conditions simple harmonic, electric vibrations, means for communicating the vibrations so produced to an elevated conductor, and means for swamping the effect of the mutual inductance between said circuit and the elevated conductor.

37. In a system for developing free or unguided, simple harmonic, electromagnetic signal-waves, a condenser, means for charging and discharging said condenser through a closed circuit having inductance adapted to produce under such conditions simple harmonic, electric vibrations, means for communicating said vibrations to a resonant circuit or group thereof attuned to the frequency of these vibrations, means of communicating the resulting electrical vibrations in said resonant circuit or group thereof to an elevated conductor, and means in each of said circuits for swamping the effect of the mutual inductance between it and the other circuits and between it and the elevated conductor.

38. In a system for selectively receiving the energy of free or unguided, simple harmonic, electromagnetic signal-waves of different frequencies, an elevated conductor, a plurality of resonant circuits associated with said elevated conductor, each resonant to the particular frequency of the electromagnetic waves, the energy of which it is to receive, and means in each of said circuits for swamping the effect of the mutual inductance between it and the other circuits and between it and the elevated conductor.

39. In a system for selectively receiving the energy of free or unguided, simple harmonic, electromagnetic signal-waves of different frequencies, a plurality of elevated conductors, each associated with a circuit resonant to the particular frequency of the electromagnetic waves, the energy of which it is to receive, and means in each of said circuits for swamping the effect of the mutual inductance between it and the other circuits and between it and the elevated conductor.

40. In a system for selectively receiving the energy of free or unguided, simple harmonic, electromagnetic signal-waves of different frequencies, a plurality of elevated conductors, each associated with a group of circuits resonant to the particular frequency of the electromagnetic waves the energy of which it is to receive, and means in each of said circuits for swamping the effect of the mutual inductance between it and the other circuits and between it and the elevated conductor.

41. In a system for selectively receiving the energy of free or unguided, simple harmonic, electromagnetic signal-waves of different frequencies, an elevated conductor, a plurality of groups of resonant circuits associated with said elevated conductor, each of said groups of circuits being resonant to the particular frequencies of the electromagnetic waves, the energy of which it is to receive, and means in each of said circuits for swamping the effect of the mutual inductance between it and the other circuits and between it and the elevated conductor.

42. In a system for receiving the energy of free or unguided, simple harmonic, electromagnetic signal-waves of a definite frequency, to the exclusion of energy of signal-waves of other frequencies, an elevated conductor, a group of resonant circuits associated with said conductor attuned to the frequency of the waves, the energy of which is to be received, and means in each of said circuits for swamping the effect of the mutual inductance between it and the other circuits and between it and the elevated conductor.

43. In a system for selectively receiving the energy of free or unguided, simple harmonic, electromagnetic signal-waves of different frequencies, each to the exclusion of the rest, an elevated conductor, a plurality of resonant circuits associated with said conductors and each attuned to the frequency of a different one of the trains of waves, the energy of which is to be received, and means in each of said circuits for swamping the effect of the mutual inductance between it and the other circuits and between it and the elevated conductor.

44. In a system for selectively receiving the energy of free or unguided, simple harmonic, electromagnetic signal-waves of different frequencies, a plurality of elevated conductors corresponding in number to the number of different frequencies to be received, groups of resonant circuits each associated with a different elevated conductor, and each attuned to a different one of the said frequencies, and means in each of said circuits for swamping the effect of the mutual inductance between it and the other circuits and between it and the elevated conductor.

45. In a system of space telegraphy, an electric translating device constituting one of the tuning elements of a resonant circuit, and adapted to utilize in its operation the potential energy developed in said resonant circuit.

46. In a system of space telegraphy, a condenser-telephone constituting one of the tuning elements of a resonant circuit.

47. In a system of space telegraphy, an electric translating device constituting one of the tuning elements of a resonant circuit, and adapted to utilize in its operation the energy of the oscillations developed in said resonant circuit.

48. In a system of space telegraphy, the combination of a closed resonant circuit and an electric translating device adapted to utilize in its operation the energy of the oscillations developed in said resonant circuit.

JOHN STONE STONE.

Witnesses:

CHARLES C. KURTZ,

ALEX. P. BROWNE.